(No Model.)

C. C. HOVER.
FRYING PAN HANDLE REST.

No. 528,100. Patented Oct. 23, 1894.

Inventor
Catharine C. Hover.

Witnesses
E. H. Monroe
O. B. Owens

By her Attorneys.
C. A. Snow & Co.

UNITED STATES PATENT OFFICE.

CATHARINE C. HOVER, OF CATSKILL, NEW YORK.

FRYING-PAN-HANDLE REST.

SPECIFICATION forming part of Letters Patent No. 528,100, dated October 23, 1894.

Application filed April 25, 1894. Serial No. 508,978. (No model.)

*To all whom it may concern:*

Be it known that I, CATHARINE C. HOVER, a citizen of the United States, residing at Catskill, in the county of Greene and State of New York, have invented a new and useful Frying-Pan-Handle Rest, of which the following is a specification.

The invention relates to improvements in frying pan rests.

The object of the present invention is to provide, for that class of frying pans which are placed in a stove hole, a rest which, when the frying pan is in position on a stove, and in one of the holes thereof, will engage the upper face of the stove, and support the handle of the pan to prevent the latter from tilting.

The invention consists in the construction and novel combination and arrangement of parts hereinafter fully described, illustrated in the accompanying drawings and pointed out in the claim hereto appended.

Figure 1:
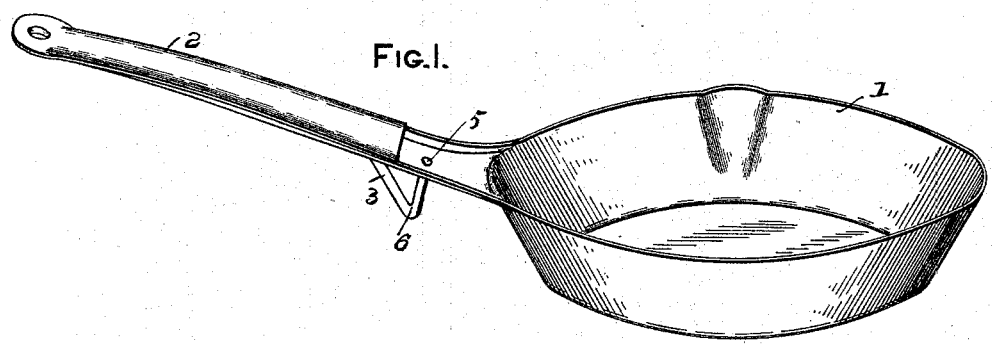
Figure 2:
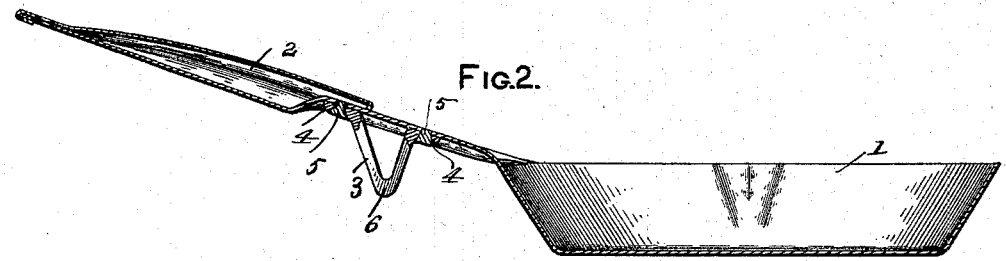
Figure 3:
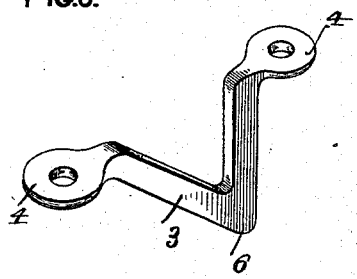
Figure 4:
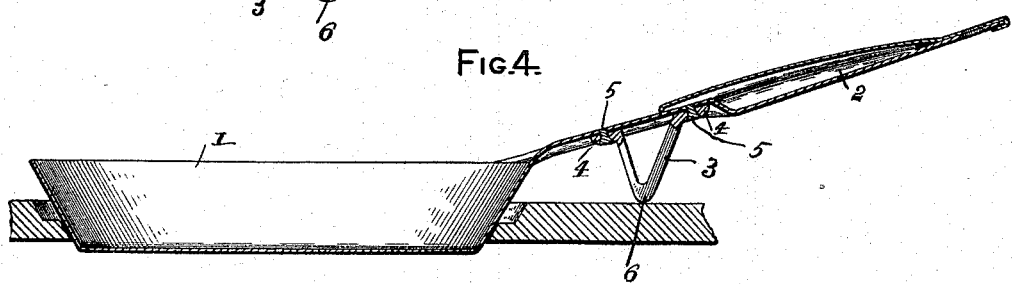

In the accompanying drawings: Figure 1 represents a perspective view of a frying-pan, having my improvements applied; Fig. 2, a longitudinal section thereof; Fig. 3, an enlarged perspective of the rest, showing it detached from the handle; Fig. 4, a sectional view showing the relation of the rest to the stove-top.

Like numerals of reference indicate corresponding parts in all the figures of the drawings.

1 designates the body of a pan having inclined sides, and adapted, as illustrated in Fig. 4 of the accompanying drawings, to be supported by them in a stove hole. The pan sinks in the stove hole in the usual manner, and its inclined handle 2 is supported by a depending rest 3, extending downward from the handle, and offset from the bottom of the pan, and having its lower end arranged in the same horizontal plane to which the pan sinks when placed in a stove hole.

The rest 3 is substantially V-shaped, and it is provided at the upper terminals of its sides with perforated ears 4, which are secured by rivets 5 or other fastening devices to a flattened portion of the inclined handle 2.

When the body of the pan is placed in the hole of a stove, the lower end or apex 6 of the V-shaped rest comes in contact with the upper face of the top of the stove, and supports the inclined handle 2, and prevents the body of the pan from turning or tilting in the stove hole. The rest is located above the bottom of the pan, and when the latter is placed horizontally on a flat supporting surface, it does not, as will be readily seen from Fig. 2 of the accompanying drawings, come in contact with the same.

It will be seen that the rest is particularly adapted for that class of frying pans and cooking utensils, which are provided with shallow bodies, and which have long or extended handles, and which are designed in cooking to be placed in the hole of a cooking stove, and that it is capable of supporting the handle when the pan is in use.

Changes in the form, proportion, and the minor details of construction may be resorted to without departing from the principle or sacrificing any of the advantages of this invention.

What I claim is—

A frying pan or cooking utensil provided with inclined sides and designed in use to be placed in the hole of a stove, and having an extended inclined handle, combined with a rest depending from the handle and offset from the body of the pan and having its lower end arranged in the same horizontal plane to which the body of the pan sinks when placed in a stove hole, substantially as and for the purpose described.

In testimony that I claim the foregoing as my own I have hereto affixed my signature in the presence of two witnesses.

CATHARINE C. HOVER.

Witnesses:
W. IRVING JENNINGS,
ALBERT C. BLOODGOOD.